United States Patent

Guy et al.

(10) Patent No.: US 10,427,552 B2
(45) Date of Patent: Oct. 1, 2019

(54) EXPANDABLE SEAT FOR A VEHICLE

(71) Applicant: Ford Global Technologies, LLC, Dearborn, MI (US)

(72) Inventors: Ian Guy, London (GB); Marcus Hoggarth, Hertfordshire (GB); Ben Carroll, London (GB); Natasha DeLange, London (GB); Matthew Graeme Leck, Ruislip (GB)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/973,795

(22) Filed: May 8, 2018

(65) Prior Publication Data

US 2018/0354389 A1  Dec. 13, 2018

(30) Foreign Application Priority Data

Jun. 9, 2017  (GB) .................................. 1709256.0

(51) Int. Cl.
*B60N 2/00* (2006.01)
*B60N 2/02* (2006.01)
*B64D 11/06* (2006.01)
*B60N 2/90* (2018.01)
*B60N 2/58* (2006.01)

(52) U.S. Cl.
CPC ................ *B60N 2/02* (2013.01); *B60N 2/58* (2013.01); *B60N 2/99* (2018.02); *B64D 11/0639* (2014.12); *B60N 2002/0288* (2013.01)

(58) Field of Classification Search
CPC ... B60N 2/02; B60N 2/58; B60N 2/99; B64D 11/0639

USPC ............ 297/233, 234, 235, 236, 237, 284.2
See application file for complete search history.

(56) References Cited

U.S. PATENT DOCUMENTS

| | | | | | |
|---|---|---|---|---|---|
| 2,696,246 | A | * | 12/1954 | Putnam | B60N 2/2854 297/236 X |
| 2,699,202 | A | * | 1/1955 | Leary | A47C 17/13 297/236 X |
| 3,743,351 | A | * | 7/1973 | Harris | A47C 13/00 297/233 X |
| 5,588,708 | A | * | 12/1996 | Rykken | A47C 7/506 297/423.2 |
| 5,660,436 | A | * | 8/1997 | Wilson | A47C 1/023 297/233 |

(Continued)

FOREIGN PATENT DOCUMENTS

| | | |
|---|---|---|
| DE | 102007040229 A1 | 2/2009 |
| DE | 102009021654 A1 | 11/2010 |

(Continued)

*Primary Examiner* — Rodney B White
(74) *Attorney, Agent, or Firm* — Vichit Chea; Price Heneveld LLP

(57) ABSTRACT

An expandable seat for a vehicle comprising a support structure movable between an expanded state and a contracted state, the support structure forming a seating region that is greater in size when the support structure is in the expanded state than when the support structure is in the contracted state, and a flexible covering movably coupled to the support structure. The support structure and the flexible covering cooperate to ensure that the flexible covering covers the seating region of the support structure when the support structure is in the expanded state and when the support structure is in the contracted state.

19 Claims, 7 Drawing Sheets

(56) References Cited

U.S. PATENT DOCUMENTS

| | | | | |
|---|---|---|---|---|
| 6,773,059 B2* | 8/2004 | Volotsenko | A47C 13/00 | |
| | | | 297/234 X | |
| 7,396,077 B2* | 7/2008 | Boulva | A47C 7/282 | |
| | | | 297/284.2 | |
| 7,578,551 B2* | 8/2009 | Linero | A47C 1/122 | |
| | | | 297/236 X | |
| 8,011,713 B2* | 9/2011 | Schlamann | B60N 2/01 | |
| | | | 297/236 X | |
| 8,118,359 B2* | 2/2012 | Kyogoku | B60N 2/3038 | |
| | | | 297/236 X | |
| 8,162,396 B2* | 4/2012 | Edwards | A47C 4/02 | |
| | | | 297/233 X | |
| 9,039,085 B2* | 5/2015 | Aselage | B60N 2/0284 | |
| | | | 297/284.11 | |
| 2002/0113473 A1* | 8/2002 | Knaus | A47C 1/023 | |
| | | | 297/284.11 | |
| 2008/0157577 A1* | 7/2008 | Lindsay | B60N 2/0224 | |
| | | | 297/284.11 | |
| 2010/0109401 A1* | 5/2010 | Booth | B60N 2/0284 | |
| | | | 297/284.11 | |
| 2011/0006573 A1* | 1/2011 | Arakawa | B60N 2/0232 | |
| | | | 297/284.11 | |
| 2011/0187146 A1 | 8/2011 | Lindsay | | |
| 2016/0137104 A1 | 5/2016 | Bortolon et al. | | |
| 2017/0151895 A1 | 6/2017 | Von Ballmoos et al. | | |

FOREIGN PATENT DOCUMENTS

| | | |
|---|---|---|
| DE | 102010039027 A1 | 2/2012 |
| DE | 102011121582 A1 | 6/2013 |
| DE | 102014209128 A1 | 12/2015 |
| DE | 112014003623 T5 | 4/2016 |
| GB | 2252723 A | 8/1992 |
| JP | 2003118437 A | 4/2003 |

* cited by examiner

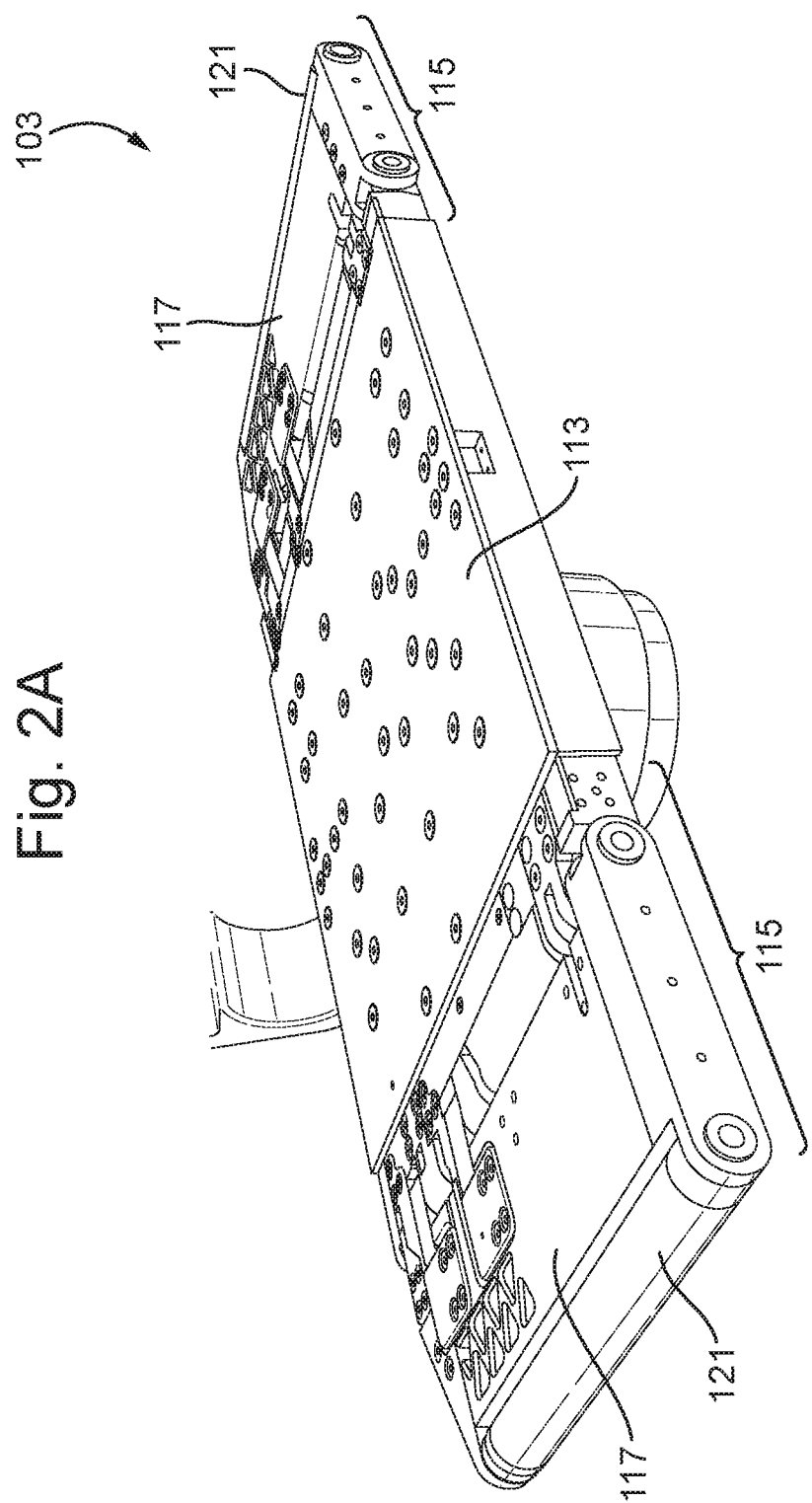

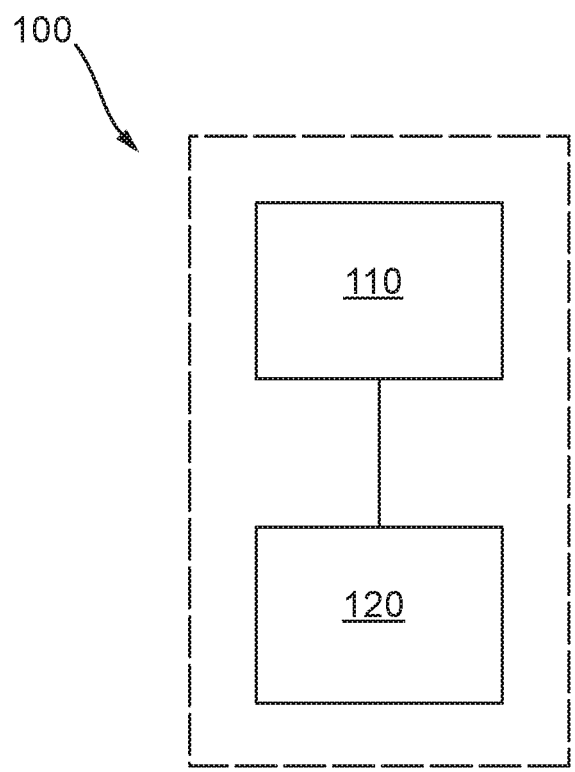

EXPANDABLE SEAT FOR A VEHICLE

FIELD OF THE INVENTION

The present disclosure generally relates to an expandable seat for a vehicle, and more particularly, relates to an expandable seat configured to provide seating for one or more occupants.

BACKGROUND OF THE INVENTION

It is common for a vehicle to have a seating arrangement that can be reconfigured according to the requirements of the occupants of the vehicle for any given journey. For example, a vehicle may be provided with seats that deploy from the body/floor of the vehicle if additional seating is required for a particular journey. However, the additional seat may restrict the amount of usable space in the passenger compartment of the vehicle when the seat is in a stowed position. It is desirable, therefore, to provide a vehicle with a seating arrangement that does not require a separate additional seat to be stowed and deployed from the body/floor of the vehicle if additional seating is required.

With the advent of semi-autonomous and fully-autonomous vehicles, it is desirable to be able to reconfigure a vehicle seating arrangement, for example by moving one or more of the seats to a different location within the vehicle. As such, the position to which a seat may be moved is generally dictated by the overall dimensions of the seat and/or the configuration of the vehicle. For example, where the occupants of a vehicle need to reconfigure the vehicle's seating arrangement, it may not be possible to move one or more of the seats to a desired location as a result of the dimensions of the seats themselves.

SUMMARY OF THE INVENTION

According to an aspect of the present disclosure there is provided an article of expandable furniture in the form of an expandable seat for a vehicle, such as a motor vehicle. The expandable seat includes a support structure being movable between an expanded state and a contracted state, the support structure forming a seating region that is greater in size when the support structure is in the expanded state than when the support structure is in the contracted state. The expandable seat also includes a flexible covering movably coupled to the support structure by virtue of a carrier assembly, the support structure and the flexible covering cooperating to ensure that the flexible covering covers the seating region of the support structure when the support structure is in the expanded state and when the support structure is in the contracted state. The carrier assembly is configured to couple a free end of the flexible covering to the support structure and allow the free end of the flexible covering to move relative to the support structure as the support structure moves between the expanded state and the contracted state.

In the context of the present disclosure, the term "seat" is understood to mean any appropriate type of structure configured to support an occupant in a seated position. In one arrangement, the seat may comprise a seat base configured to support an occupant, for example the seat may comprise a bench or a stool. As such, the expandable seat may include an expanding bench seat or an expanding stool.

In another arrangement, the seat may comprise a seat base and a seat back, for example the seat may comprise a chair. In this arrangement, the seat base may be configured to expand independently from the seat back, or together with the seat back. As such, the present disclosure may provide an expandable chair having an expandable seat base, or an expandable chair having an expandable seat base and an expandable seat back. In another arrangement, the seat may comprise a seat base that is unable to expand and contract, and an expandable seat back configured to support an occupant in a seated position.

The expandable seat may be configured to seat a plurality of occupants when the support structure is in the expanded state. The expandable seat may be configured to seat a single occupant, for example only a single occupant, when the support structure is in the contacted state.

The support structure may be configured to expand laterally. For example, the support structure may be configured to adjust the seating capacity of the expandable seat. The support structure may comprise a body portion and at least one other portion that is movably, e.g., slidably and/or rotatably, coupled to the body portion to cause the support structure to expand. For example, the support structure may comprise at least one side portion moveably coupled to the body portion, wherein the movement of the side portion relative to the body portion results in the seating region changing in size. The side portion may be deployable from within the body portion. The body portion may be a unitary structure in an assembled configuration. The side portion may be a unitary structure in an assembled configuration. The body portion may be formed from a plurality of elongate members, such as slats. The side portion may be formed from a plurality of elongate members, such as slats. The elongate members of the body portion may interlock with the elongate members of the side portion. The elongate members of the body portion may be moveable with respect to one another. The elongate members of the side portion may be moveable with respect to one another.

The support structure may be movable between a first state where the seating region is planar and a second state where the seating region is contoured. The support structure may comprise any appropriate mechanism/device to cause the seating region to change between a planar state and a contoured state, such as by virtue of one or more moveable portions, one or more bendable portions, and/or one or more shape-shifting programmable materials. For example, the support structure may comprise at least one folding portion that is rotationally coupled to the remainder of the support structure to cause the support structure to at least partially fold. The body portion may comprise the folding portion. The side portion may comprise the folding portion.

The support structure may be configured to taper laterally, for example towards a lateral edge of the support structure. For example, where the support structure forms a seat base, the support structure may be configured to taper in a horizontal plane of the support structure, e.g., in a plane substantially parallel to the seating region of the seat base. Additionally or alternatively, where the support structure forms a seat back, the support structure may be configured to taper in a vertical plane of the support structure, e.g., in a plane substantially parallel to the seating region of the seat back. Where the article of expandable furniture comprises a chair having a seat back and a seat base each having a folding portion, each of the seat base and the seat back may taper, for example towards a lateral edge, to avoid the seat base and the seat back engaging one another, for example upon movement of at least one of the respective folding portions of seat back and the seat base. The support structure may be configured to taper such that a lateral edge of the support structure is shorter than a mid-portion of the support structure. For example, where the seating region comprises a seat base, the depth of the seating region may be greater towards the middle of the seating region compared to the lateral edges of the seating region. Where the seating region comprises a seat back, the height of the seating region may be greater towards the middle of the seating region compared to the lateral edges of the seating region.

The support structure may have at least one moveable tapering portion configured to adjust the amount by which the support structure tapers. For example, the moveable tapering portion may be moveable from a first position in which the support structure is not tapered towards an edge, and a second position where the support structure is tapered towards the edge. The amount by which the support structure tapers towards the edge may be a function of curvature of the support structure. For example, when the support structure is in the planar state, the tapering portion may be in a first position, and when the support structure is in the contoured state, the tapering portion may be in a second position, which imparts a tapered form to the support structure.

The support structure may comprise at least one bearing element configured to aid the movement of the flexible covering relative to the support structure. For example, the support structure may have at least one roller bearing configured to engage the flexible covering. The bearing element may be a plain bearing element.

The flexible covering may be configured to wrap at least partially around a lateral edge of the support structure. The carrier assembly may comprise a track or rail attached to the support structure, and slidable and/or rotational element attached to the flexible covering. The slidable element may be biased away from a lateral edge of the support structure, for example an edge of the support structure around which the flexible covering is wrapped.

The carrier assembly may be configured to movably couple a free end of the flexible covering to the underside of the support structure, for example when the flexible covering is wrapped around an edge of the support structure.

The expandable seat may comprise a plurality of support ribs arranged longitudinally across the seating region. The longitudinal axis of each of the support ribs may be aligned, e.g., parallel, with a lateral edge of the support structure. The plurality of support ribs may comprise at least one support rib that is fixed relative to the support structure. The plurality of support ribs may comprise at least one support rib that is free to move, or partially constrained, relative to the support structure.

The plurality of support ribs may be moveable between a first state where the support ribs are more closely grouped when the support structure is in the contracted state, and a second state where the support ribs are more separated when the support structure is in the expanded state.

The flexible covering may comprise the plurality of support ribs. At least one of the plurality of support ribs may be trapezoidal in cross section. At least one of the support ribs may vary in cross section along its longitudinal axis. For example, the support rib may be thinner towards the axial ends of the support rib. The axial ends of the support rib may be positioned towards a longitudinal edge of the support structure when the expandable seat is in an assembled configuration.

According to another aspect of the present invention, an expandable vehicle seat is provided. The expandable seat for a vehicle includes a support structure movable between expanded and contracted states and forming a seating region greater in size when in the expanded state than in the contracted state, and a flexible covering movably coupled to the support structure, the support structure and the flexible covering cooperating such that the flexible covering covers the seating region of the support structure when the support structure is in the expanded and contracted states.

According to a further aspect of the present disclosure there is provided a method of expanding a seat for a vehicle. The method includes moving a support structure of the seat between an expanded state and a contracted state to form a seating region that is greater in size in the expanded state than when in the contracted state, and moving a flexible covering of the seat relative to the support structure by virtue of a carrier assembly, the support structure and the flexible covering cooperating to ensure that the flexible covering covers the seating region of the support structure when the support structure is in the expanded state and when the support structure is in the contracted state.

The carrier assembly is configured to couple a free end of the flexible covering to the support structure and allow the free end of the flexible covering to move relative to the support structure as the support structure moves between the expanded state and the contracted state. The method may comprise moving a portion of the seat to cause the seating region of the support structure to change between a first state where the seating region is planar and a second state where the support structure is contoured.

To avoid unnecessary duplication of effort and repetition of text in the specification, certain features are described in relation to only one or several aspects or arrangements of the disclosure.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 2A is a perspective view of a vehicle seat support structure shown in a contracted state;

FIG. 5 is a flow diagram of a method of expanding a seat of a vehicle, according to one embodiment.

DETAILED DESCRIPTION OF THE PREFERRED EMBODIMENTS

The present disclosure provides an expandable seat 101 that is particularly useful for a vehicle, according to one embodiment. The vehicle may be any type of vehicle, such as a car, a van, a truck, a marine vessel or an aircraft. While the below description exemplifies use of the expandable seat 101 in a vehicle, the expandable seat 101 may be configured for use in any other appropriate situation, for example for use in a building and/or an outdoor event, according to other embodiments.

Figure 1A:
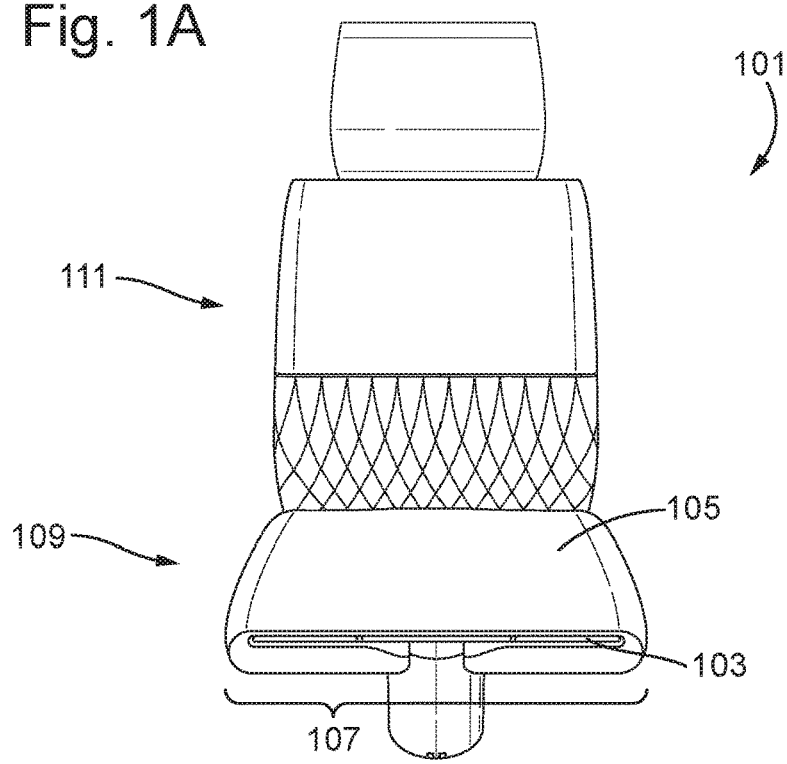
FIG. 1A is a front view of an expandable vehicle seat shown in a first configuration, according to one embodiment.
Figure 1B:
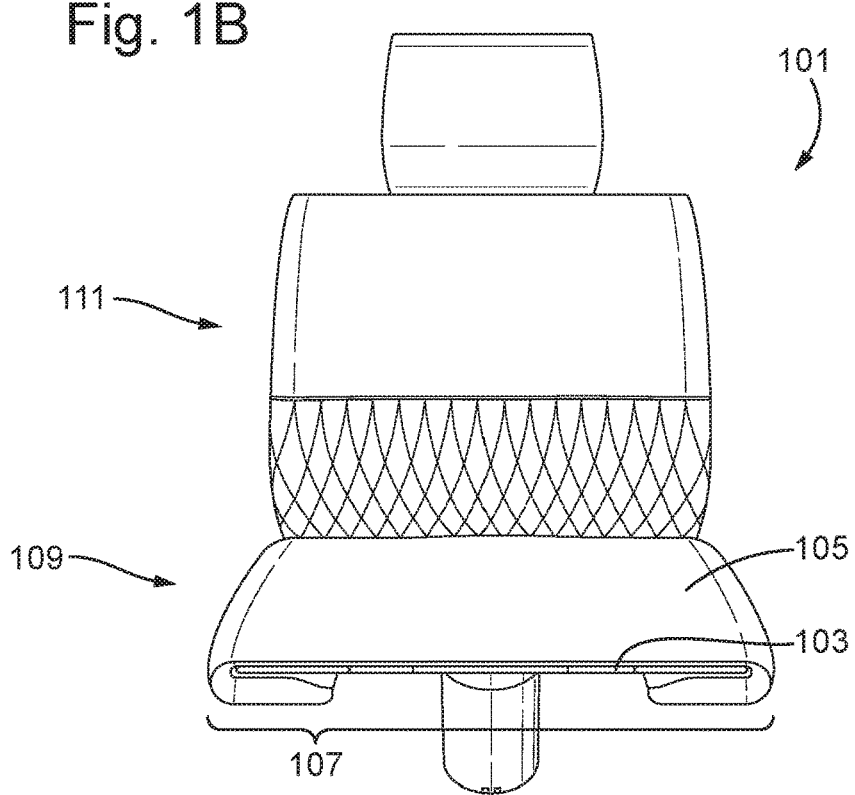
FIG. 1B is a front view of the expandable vehicle seat shown in a second configuration.
Figure 1C:
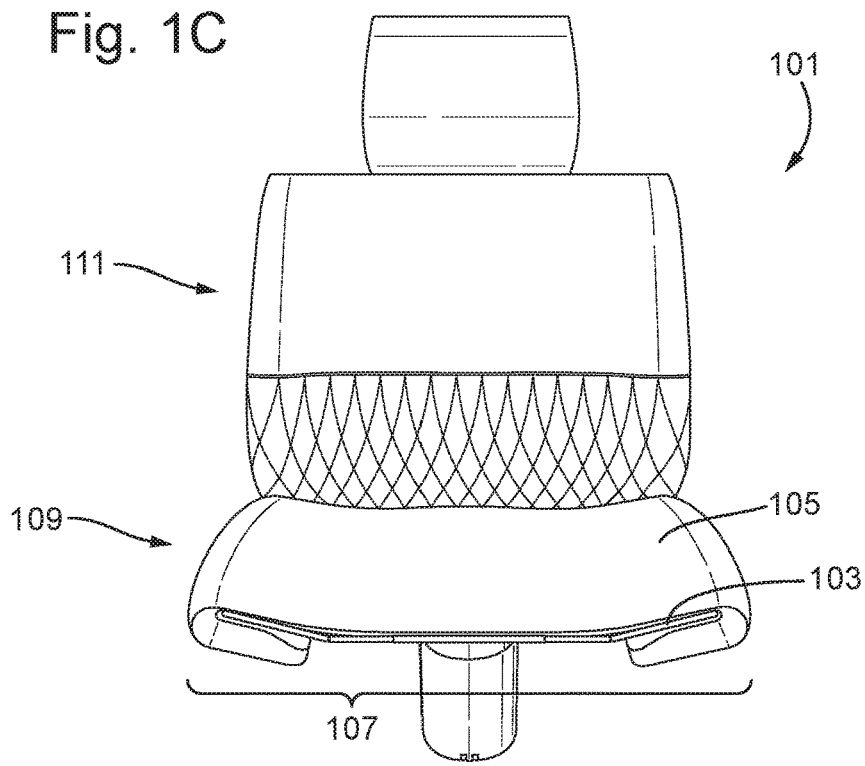
FIG. 1C is a front view of the expandable vehicle seat shown in a third configuration.
Figure 1D:
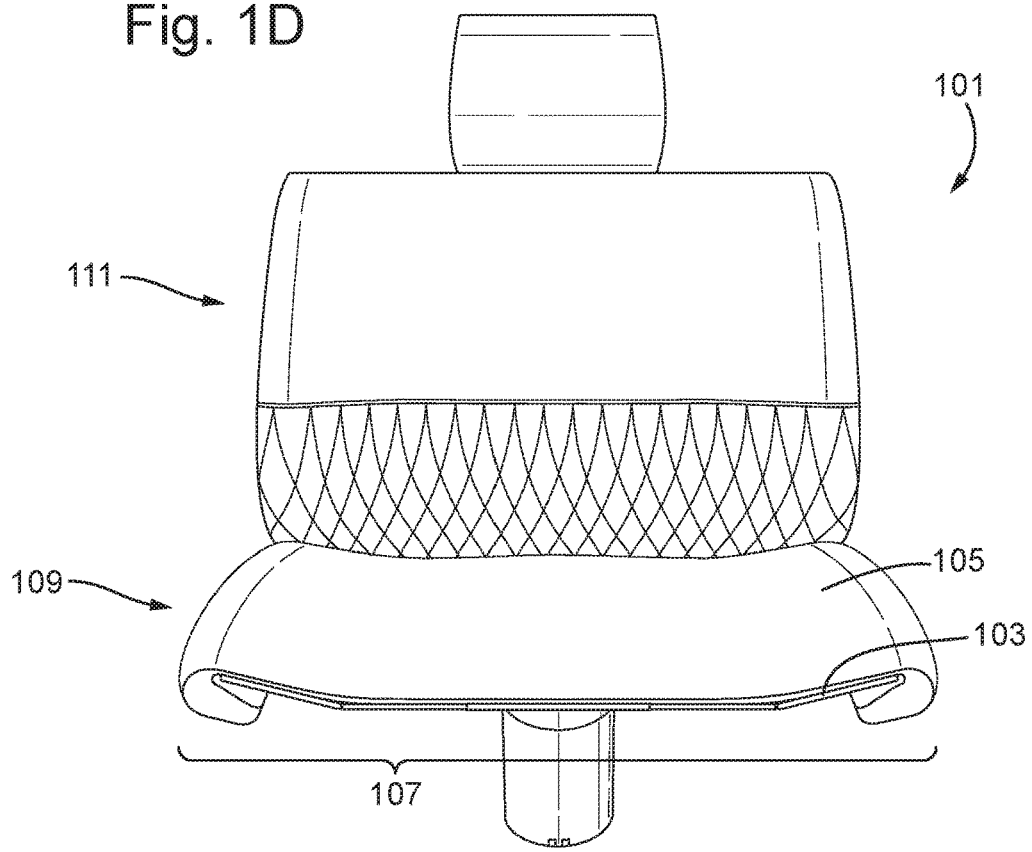
FIG. 1D is a front view of the expandable vehicle seat shown in a fourth configuration.

FIGS. 1A-1D show an expandable seat 101 in various operational states. For example, FIG. 1A shows the expandable seat 101 in a contracted state, e.g., a fully contracted state, and FIGS. 1B-1d show the expandable seat 101 in various expanded states. The limits by which the expandable seat 101 may be expanded and contracted are not limited to those states shown in the appended figures, and the expandable seat 101 be expanded and contacted by any appropriate amount depending on the configuration of the expandable seat 101 and/or the environment in which the expandable seat 101 is installed.

In the arrangement shown in FIGS. 1A-1d, the expandable seat 101 is configured for use in a vehicle. In particular, the expandable seat 101 is configured to expand from a size suitable for a single occupant, for example only a single occupant (see FIG. 1A), to a size suitable for one or more occupants, for example two occupants (see FIG. 1d). FIGS. 1B and 1C depict intermediate states of expansion, and show that the expandable seat 101 may be adjusted to any size required by the occupant(s), as allowed for by the configuration of the expandable seat 101 and the environment in which the expandable seat 101 is installed. In this manner, the expandable seat 101 according to the present disclosure provides a single seat that may be configured for use depending on the requirements of the occupant(s) of the vehicle for any given journey. In particular, the expandable seat 101 allows for the seating capacity of the vehicle to be adjusted without the need for one or more additional deployable/stowable seats.

In order for the expandable seat 101 to expand and contract between various states, the expandable seat 101 comprises a support structure 103 and a flexible covering 105. The support structure 103 is movable between a contacted state and an expanded state, forming a seating region 107 that is greater in size when the support structure 103 is in the expanded state than when the support structure 103 is in the contracted state. In the arrangement show in FIGS. 1A-1d, the support structure 103 forms a seating region 107 having a seat base 109 and a seat back 111, each of which is movable between an expanded state and a contacted state. However, in one or more other arrangements (not shown), the seating region 107 may be formed from only a seat base.

The flexible covering 105 is movably coupled to the support structure 103, the support structure 103 and the flexible covering 105 cooperating to ensure that the flexible covering 105 covers the seating region 107 of the support structure 103 when the support structure 103 is in each of the expanded state and the contracted state. For example, the flexible covering 105 is movably coupled to the support structure 103 to allow the flexible covering 105 to move relative to the support structure 103 to ensure that the seating region 107 does not comprise an exposed portion of the support structure 103 when the support structure 103 is in either of the expanded state and the contracted state. This is advantageous as it allows for the seating region 107 of the expandable seat 101 to remain fully functional irrespective of the state, e.g., the size, of the support structure 103. Moreover, the expandable seat 101 according to the present disclosure allows a single seat covering to be used to sufficiently cover the support structure 103 so as to avoid the use of additional coverings when the expandable seat 101 is in an expanded state. The various operational states of the expandable seat 101 shown in FIGS. 1A-1d are discussed in more detail below.

Figure 2B:
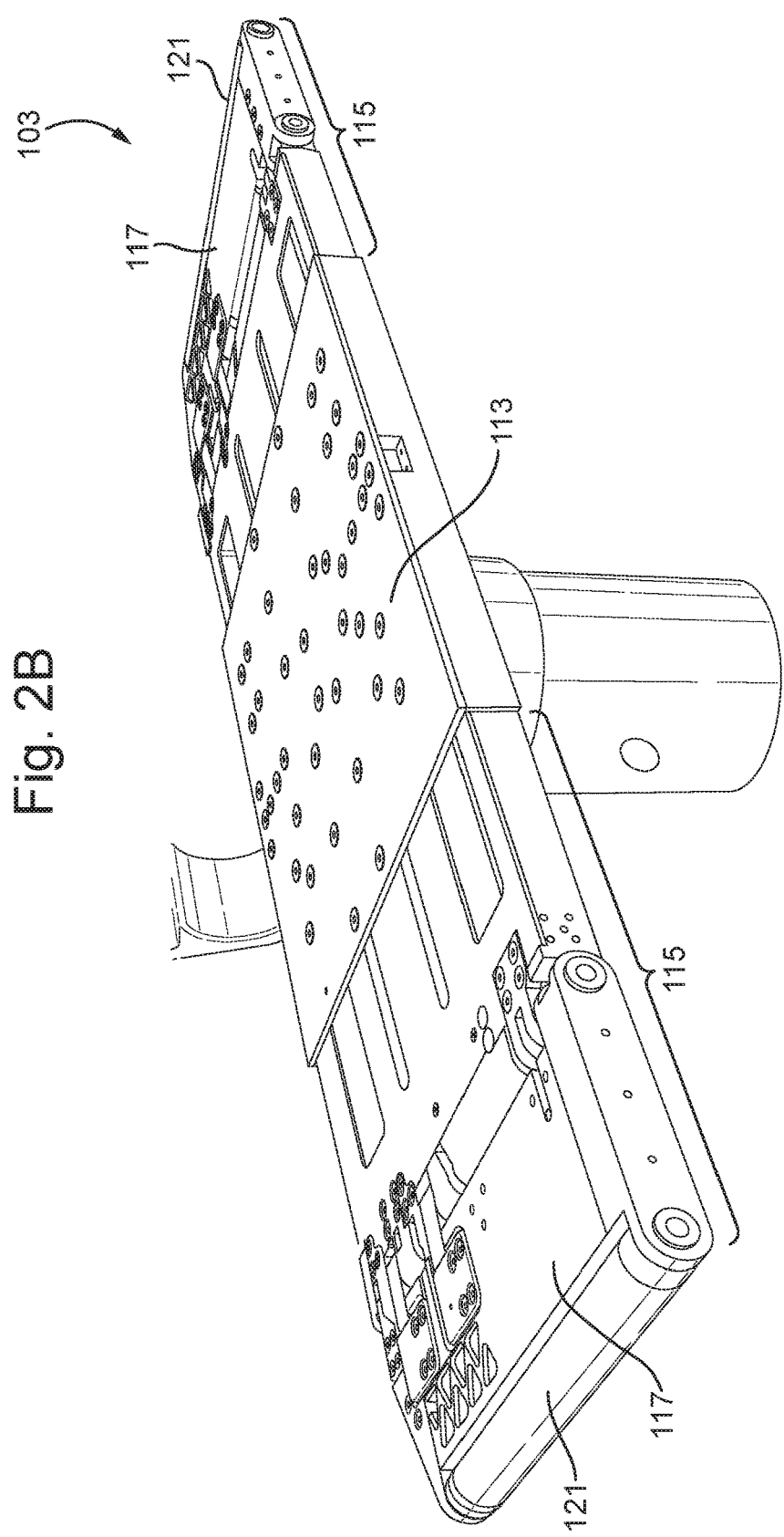
FIG. 2B is a perspective view of the vehicle seat support structure shown in an expanded state.

FIGS. 2A and 2B show the support structure 103 in a contracted state and an expanded state respectively, without the flexible covering 105 coupled to the support structure 103. The support structure 103 comprises a body portion 113 and at least one other portion, for example a side portion 115, that is movably coupled to the body portion 113 to cause the support structure 103 to expand. For example, the body portion 113 may be rotationally and/or slidably coupled to at least one side portion 115. In FIGS. 2A and 2B, the support structure 103 is provided with two side portions 115 that are deployable from within the body portion 113 to cause the support structure 103 to expand laterally. For example, FIG. 2A shows the support structure 103 in a contracted state with each of the side portions 115 withdrawn into the body portion 113, and FIG. 2B shows the support structure 103 in an expanded state with each of the side portions 115 deployed from the body portion 113. However, the support structure 103 may be configured to expand in any appropriate manner.

The expandable seat 101 may comprise one or more actuators configured to move the side portions 115 relative to the body portion 113. The body portion 113 and the side portion 115 may be operatively connected, for example by virtue of a rack and pinion system.

In the arrangement shown in FIGS. 2A and 2B, the body portion 113 and the side portions 115 are unitary structures when in respective assembled configurations. For example, the body portion 113 comprises a cuboid structure configured to house the side portions 115, so that the side portions 115 may be stowed within and deployed from the body portion 113. In another arrangement (not shown), the support structure 103 may comprise a plurality of interlocking elongate members, such as slats, that are configured to move relative to each other to cause the support structure 103 to expand/contract. For example, the body portion 113 may comprise a first series of slats and the side portion may comprise a second series of slats configured to interlock with the first series of slats. In one arrangement, the support structure 103 may comprise an actuator configured to move the second series of slats relative to the first series of slats to cause the support structure 103 to expand in a lateral direction, in a similar manner to that provided by the arrangement shown in FIGS. 2A and 2B. In other words, the support structure 103 may be configured such that each of the slats that form the side portion 115 are moveable over a similar distance in the lateral direction to cause the support structure 103 to expand laterally in a uniform manner.

In another arrangement (not shown), each of the slats that form the side portion 115 may be configured to move by a different distance in the lateral direction to cause the support structure 103 to expand laterally in a non-uniform manner. For example, each of the slats of the side portion 115 may be independently moveable and may be configured to project away from the body portion 113 by different amounts to cause the lateral edges of the seating region 107 to become inclined to a longitudinal axis of the seating region 107. In the context of the present disclosure, the longitudinal axis of the seating region 107 is an axis that runs between a front edge of a seat base 109 and a rear edge of a seat base 109, and/or an axis that runs between a top edge of a seat back 111 and a rear bottom edge of a seat back 111. Thus, where the support structure 103 forms a seat base 109, the support structure 103 may be configured so that a front edge of the seating region 107 expands by a different amount and/or at a different rate compared to rear edge of the seating region 107. Similarly, where the support structure 103 form a seat back 111, the support structure 103 may be configured so that a top edge of the seating region 107 expands by a different amount and/or at a different rate compared to a bottom edge of the seating region 107. This is advantageous as it allows for the lateral edges of the seating region 107 to become angled and/or curved to allow the seating region 107 of the expandable seat 101 to adjoin and/or conform to one or more other surfaces, such as a curved edge of another seat or any other appropriate portion of a vehicle in which the expandable seat 101 is installed.

In the arrangement shown in the appended figures, the body portion 113 is provided towards the center of the seating region 107, the side portions 115 being configured to slide laterally out of the body portion 113 in a symmetrical manner. However, the body portion 113 may be provided at any appropriate position of the expandable seat 101. For example, the body portion 113 may be provided towards the edge of the support structure 103, with the support structure 103 having only one side portion 115 that moves relative to the body portion 113 to cause the support structure 103 to expand. Indeed, the support structure 103 may have any appropriate number of side portions 115 configured to move relative to the body portion 113.

Where the support structure 103 comprises two or more side portions 115, the side portions may be selectively actuated to cause each of the side portions 115 to expand independently from one another. Alternatively, each of the side portions 115 may be operatively connected, for example by virtue of a geared mechanism, such that actuation of the one of the side portions 115 causes another of the side portions 115 to move relative to the body portion 113.

Where the side portions 115 are operatively connected by a geared mechanism, the gearing ratio may be such that each of the side portions 115 moves at substantially the same speed relative to the body portion 113. Alternatively, the side portions 115 may be geared to cause one of the side portions 115 to move at a different rate than another of the side portions 115 to cause the support structure 103 to expand in an asymmetrical manner. Alternatively, each of the side portions 115 may be provided with an independent actuator such that the control of each side 115 portion is independent from another side portion 115.

While FIGS. 2A and 2B show only the portion of the support structure 103 that forms the seat base 109 of the expandable seat 101, it is to be understood that the support structure 103 may form the seat back 111 of the expandable seat 101 in addition to or instead of the seat base 109.

In the arrangement shown in FIGS. 2A and 2B, the support structure 103 is configured to move between an un-expanded state having a planar, e.g., flat, seating region 107, and an expanded state also having a planar, e.g., flat, seating region 107. However, the support structure 103 may comprise one or more folding portions 117 that can be moved to adjust the contours of the seating region 107. For example, the support structure 103 may comprise one or more hinged portions, such as one or more wings or leaves, configured to pivot with respect to the body portion 113 and/or the side portions 115. In the arrangement shown in FIGS. 2A and 2B, the folding portions 117 are provided towards the lateral edges of the seating region 107 and may be folded about a longitudinal axis of the seating region 107 which is an axis that runs between the front of the seating region 107 and the rear of the seating region 107. However, the rotational axis of the folding portion 117 may be provided in any appropriate orientation depending on the desired configuration of the expandable seat 101.

In FIGS. 2A and 2B, each of the folding portions 117 are provided on respective side portions 115 of the support structure 103, such that the profile of the side portion 115 may be adjusted depending on the amount by which the folding portion 117 is rotated. In this manner, the support structure 103 is able to form a contoured seating region 107 in both an unexpanded state and an expanded state. In other words, the action of moving the folding portions 117 may be independent from the action of moving the side portions 115 relative to the body portion 113 of the support structure 103. This can be achieved by providing independent actuators that are configured to rotate the folding portions 117 to provide a contoured seating region 107. For example, the support structure 103 may comprise one or more actuators located at and/or in a hinge that connects the folding portion 117 to the remainder of the side portion 115.

In another arrangement (not shown), the action of moving the folding portions 117 may be linked to the action of moving the side portions 115 relative to the body portion 113 of the support structure 103. For example, the support structure 103 may comprise an operative connection between an actuator configured to rotate the folding portion 117 and an actuator configured to slide the side portion 115 relative to the body portion 113. In this manner, the amount by which the folding portions 117 are folded may be a function of the distance by which the side portions 115 are extended from the body portion 113.

In another arrangement (not shown), the body portion 113 may comprise one or more folding portions 117. For example, the body portion 113 may comprise at least one movable coupling, such as a hinge, configured to allow the body portion to adopt a bent or curved profile. In this manner, the seating region 107 may be moved between a planar state and a contoured state by virtue of at least one folding portion 117 provided on at least one of body portion 113 and the side portion 115.

Figure 3A:
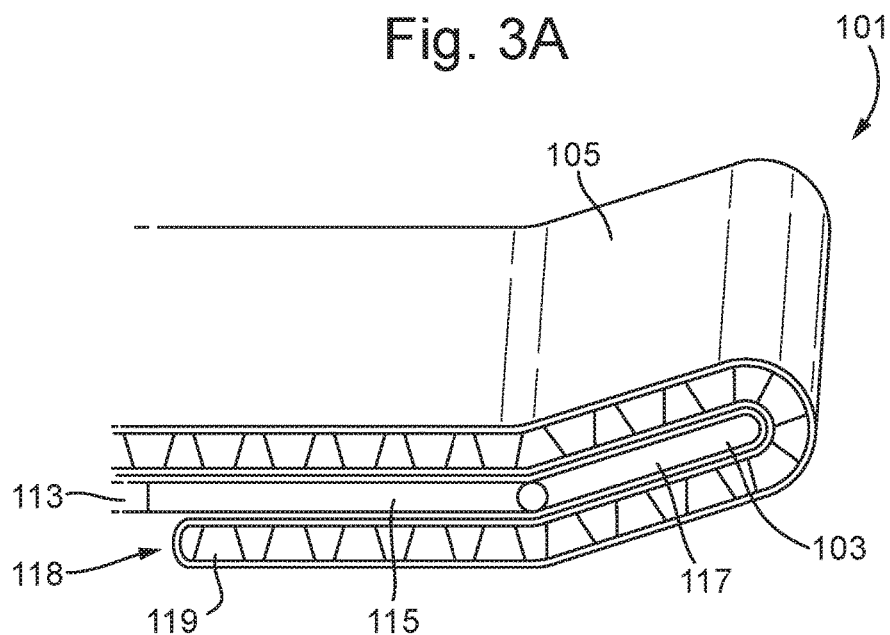
FIG. 3A is a partial cross-sectional view of the vehicle seat shown in the contracted state.
Figure 3B:
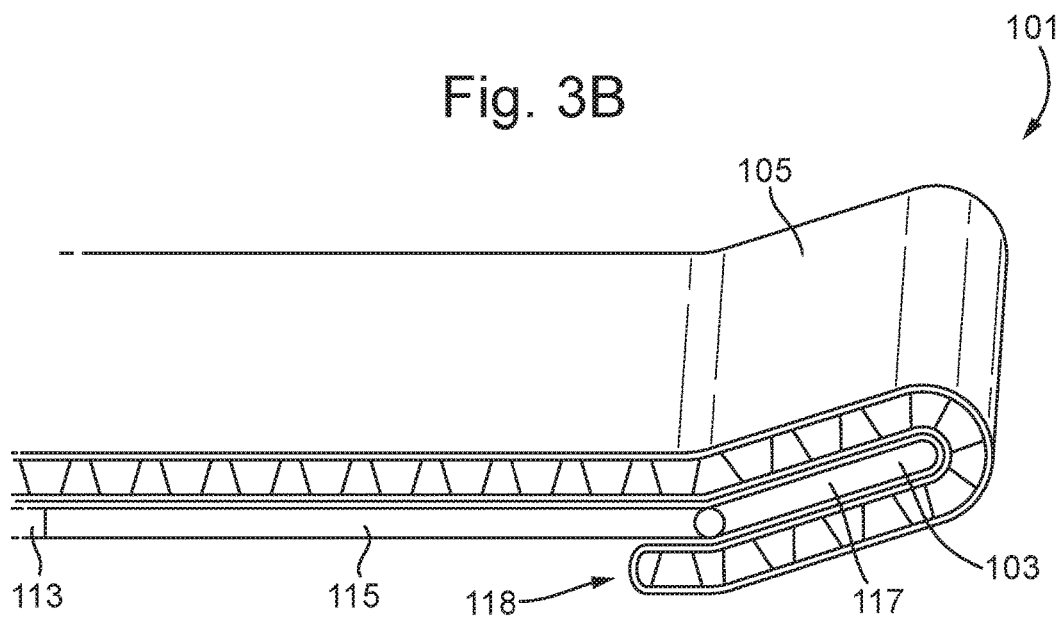
FIG. 3B is a partial cross-sectional view of the vehicle seat in the expanded state.
Figure 4A:
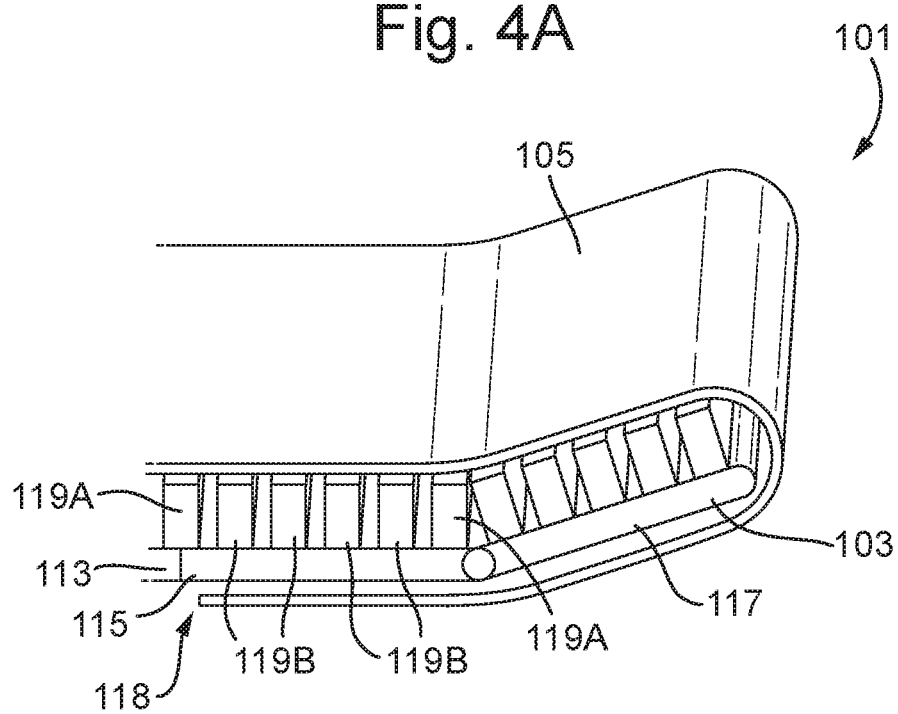
FIG. 4A is a partial cross-sectional view of another vehicle seat shown in the contracted state.
Figure 4B:
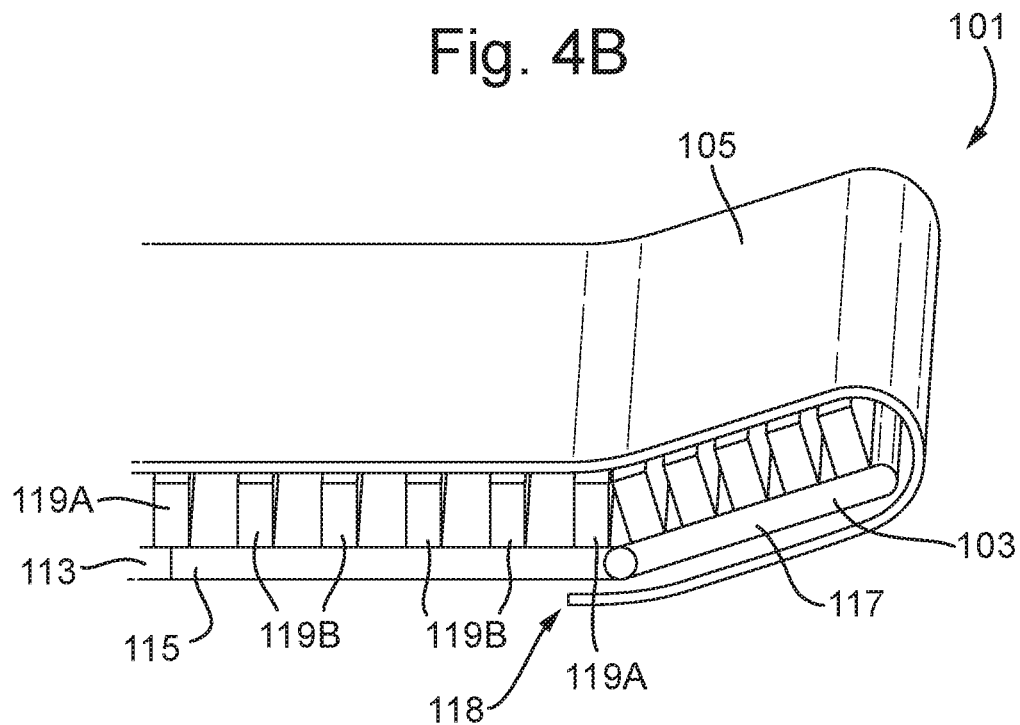
FIG. 4B is a partial cross-sectional view of another vehicle seat shown in the expanded state.

FIGS. 3A and 4A show partial cross sections of the expandable seat 101 in a contracted state, and FIGS. 3B and 4B show partial cross sections of the expandable seat 101 in an expanded state. In the arrangement of FIGS. 3A to 4B, the flexible covering 105 is able to move relative to the support structure 103 so as to cover the seating region 107 of the support structure 103 in both the contracted and expanded states. For example, the flexible covering 105 may be configured to extend across the seating region 107 and wrap around a lateral edge of the support structure 103, so as to cover the entirety of the seating region 107. A free end 118 of the flexible covering 105 may be movably coupled to the support structure 103, for example on the underside of the support structure 103, to allow the free end 118 to slide towards the lateral edge of the support structure 103 as the support structure 103 expands.

The flexible covering 105 may be movably coupled to the support structure 103 using at least one carrier assembly (not shown). The carrier assembly may be any appropriate type of device configured to couple the flexible covering 105 to the support structure 103 and allow the free end 118 of the flexible covering 105 to move relative to the support structure 103 as the support structure 103 expands and contracts. For example, the carrier assembly may comprise a sliding member moveably coupled to a track, such as a rail or a runner, provided on the support structure 103. The sliding member may be configured to attach the free end 118 of the flexible covering 105 to the track. In one arrangement, the sliding member may be formed as part of the flexible covering 105 during the manufacture/assembly of the flexible covering 105, so that the flexible covering 105 may be attached directly to the track on the support structure 103. The free end 118 of the support structure 103 may be biased away from the lateral edge of the support structure 103, so as to tension the flexible covering 105, for example to prevent the flexible covering 105 from sagging when the free end 118 of the flexible covering 105 is coupled to the underside of the support structure 103 and the support structure 103 is in a contracted, or not fully expanded, state.

FIGS. 3A-4B show one side of the expandable seat 101. However, the other side of the expandable seat 101 may have a similar set-up to that shown in FIGS. 3A-4B, so that the flexible covering 105 has two free ends 118 that can each move in similar manner. For example, FIGS. 1A-1d show an expandable seat 101 having a flexible covering 105 with two free ends 117. Alternatively, the flexible covering 105 may have only one free end 117, with the other end of the flexible covering 105 being fixed to the support structure 103.

In one arrangement, the flexible covering 105 may be fixed or moveably coupled to another portion of the expandable seat 101, such as a stand or base portion of the expandable seat 101, and/or to one or more articles, such as a wall or another seat, adjacent to the expandable seat 101 when installed to a vehicle.

The flexible covering 105 may be secured to the support structure 103 in order to prevent the flexible covering 105 from lifting away from the support structure 103 upon actuation of the folding portions 117. For example, where the folding portions 117 are actuated to form a contoured seating region 107, the flexible covering 105 may be attached to the support structure 103 to prevent the flexible covering 105 from lifting away from the support structure 103, and spanning between the raised edges of the folding portions 117. This may be achieved by providing at least one securing member, such a zipper, a Velcro® fastener, and/or any other appropriate fastener, at or near to the axis about which the folding member 117 pivots.

In FIGS. 3A and 3B, the flexible covering 105 comprises a plurality of elongate support ribs 119 that extend longitudinally across the seating region 107 when the flexible covering 105 is coupled to the support structure 103. The support ribs 119 may be manufactured from a resilient foam, or any other appropriate material, that provides suitably comfortable support for an occupant of the expandable seat 101.

The support ribs 119 are arranged within the flexible covering 105 to allow the flexible covering 105 to roll around the lateral edge of the support structure 103 as the support structure 103 moves between an expanded state and a contracted state. In the arrangement shown in FIGS. 3A and 3B, the support ribs 119 have a trapezoidal cross section, which helps the flexible covering 105 to roll around the edges of the support structure 103, and/or over a contoured support structure 103. However, the support ribs 119 may have any appropriate shape that permits the flexible covering 105 to bend/flex in a direction aligned or parallel to the lateral edge of the support structure 103.

In FIGS. 3A and 3B, the support ribs 119 are provided in between two layers of flexible material, which in one embodiment is a woven material, so that the support ribs 119 are at least partially contained within the flexible covering 105. In one arrangement, the layer of flexible material in contact with the support structure 103 may be a low friction material configured to aid the relative movement between the flexible covering 105 and the support structure 103. This may be of particular advantage when the expandable seat 101 expands/contracts when an occupant is seated in the expandable seat 101. Additionally or alternatively, the support structure 103 may be provided with one or more low friction surfaces or coatings in order to help the relative movement between the flexible covering 105 and the support structure 103.

As shown in FIGS. 2A and 2B, the support structure 103 may have at least one bearing element, such as a roller bearing, configured to aid the flexible covering 105 move freely over the support structure 103, and prevent the flexible covering 105 from snagging on the support structure 103. For example, the support structure 103 may be provided with one or more rollers 121 positioned towards the lateral edge of the support structure 103. Provision of a bearing element close to the lateral edge may be particularly useful where the free end 117 of the flexible covering 105 is tensioned away from the lateral edge.

In another arrangement (not shown), the support ribs 119 may be attached to only a single layer of material. In such an arrangement, the support ribs 119 may be in direct contact with the support structure 103, and the support ribs 119 may be configured to slidably engage support structure 103 as the support structure expands/contracts. It may be beneficial, therefore, to provide one or more bearing elements on the support ribs 119 to aid the relative movement between the support ribs 119 and the support structure 103. The support ribs 119 may be attached to the flexible material in any appropriate manner, for example by virtue of one or more fasteners, stitching and/or adhesive.

FIGS. 4A and 4B show an alternative arrangement of the expandable seat 101, in which at least one of the support ribs 119 is attached to the support structure 103, and the flexible covering 105 is free to move over the support ribs 119. For example, the expandable seat 101 may comprise one or more fixed support ribs 119a, which are unable to move relative to the support structure 103, and one or more free, or partially constrained, support ribs 119b that are able to move relative to the support structure 103. In FIGS. 4A and 4B, the support ribs 119 are arranged so that a plurality of the free support ribs 119b are arranged in between two of the fixed support ribs 119a, such that as the side portion 115 moves relative to the body portion 113, the distance between the two fixed support ribs 119a varies. In this manner, the fixed and free support ribs 119a, 119b are able to move between a closed grouping, as shown in FIG. 4A, when the expandable seat 101 is in a contracted state, and a more open grouping, as shown in FIG. 4B, when the expandable seat 101 is in an expanded state. In one arrangement, the configuration shown in FIGS. 3A and 3B may be combined with the configuration shown in FIGS. 4A and 4B.

The present disclosure also provides a method 100 of expanding and/or contracting the above described expandable seat 101. The method 100 is depicted in FIG. 5, and will now be described with reference to FIGS. 1A-1d. The method comprise a step 110 of moving the support structure 103 of the expandable seat 101 between an expanded state and a contracted state to form the seating region 107 that is greater in size when the support structure 103 is in the expanded state than when the support structure 103 is in the contracted state. The method further comprise a step 120 of moving, for example simultaneously moving, the flexible covering 105 relative to the support structure 103, the support structure 103 and the flexible covering 105 cooperating to ensure that the flexible covering 105 covers the seating region 107 of the support structure 103 when the support structure 103 is in the expanded state and when the support structure 103 is in the contracted state.

For example, FIG. 1A shows the expandable seat 101 in a contracted state, such as a fully contracted state, and FIG. 1*d* shows the expandable seat 101 in an expanded state, such as a fully expanded state. FIGS. 1B and 1C show the expandable seat 101 at intermediate states of expansion/contraction. However, the expandable seat 101 may be configured to expand and contract between any appropriate levels of expansion or contraction, depending on the configuration of the expandable seat 101 and the environment in which the expandable seat 101 is installed, and the states of expansion/contraction are not limited to those shown in FIGS. 1A-1*d*.

The method 100 may comprise a step of moving the support structure 103 between a first state, as shown in FIGS. 1A and 1B, where the seating region 107 is planar, i.e., flat and a second state, as shown in FIGS. 1C and 1*d*, where the seating region 107 is contoured. The seating region 107 is movable between the first and second states by virtue the movement of the one or more folding portions 117. In the arrangement shown in FIGS. 1C and 1*d*, the folding portions 117 are inclined to the remainder of the seating region 107 so as to provide wings towards the lateral edges of the expandable seat 101. The step of folding the wings may be carried out before, after or at the same time as the step 110 of expanding/contracting the support structure 103 and/or the step 120 of moving the flexible covering 105.

It will be appreciated by those skilled in the art that although the disclosure has been described by way of example with reference to one or more arrangements, it is not limited to the disclosed arrangements and that alternative arrangements could be constructed without departing from the scope of the disclosure as defined by the appended claims.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. An expandable seat for a vehicle, comprising:
a support structure movable between expanded and contracted states and forming a seating region that is greater in size when in the expanded state than in the contracted state, wherein the support structure tapers laterally;
a flexible covering movably coupled to the support structure, the support structure and the flexible covering cooperating to ensure that the flexible covering covers the seating region of the support structure when the support structure is in the expanded state, and in the contracted state; and
a carrier assembly coupling a free end of the flexible covering to the support structure and allowing the free end of the flexible covering to move relative to the support structure as the support structure moves between the expanded state and the contracted state.

2. The expandable seat according to claim 1, wherein the expandable seat is configured to seat a plurality of occupants when the support structure is in the expanded state.

3. The expandable seat according to claim 1, wherein the support structure is configured to expand laterally.

4. The expandable seat according to claim 1, wherein the support structure comprises a body portion and at least one other portion that is movably coupled to the body portion to cause the support structure to expand.

5. The expandable seat according to claim 1, wherein the support structure is movable between a first state where the seating region is planar and a second state where the seating region is contoured.

6. The expandable seat according to claim 1, wherein the support structure comprises at least one bearing element configured to aid the movement of the flexible covering relative to the support structure.

7. The expandable seat according to claim 1, wherein the flexible covering is configured to wrap around a lateral edge of the support structure.

8. The expandable seat according to claim 1, wherein the carrier assembly is configured to movably couple a free end of the flexible covering to an underside of the support structure.

9. An expandable seat for a vehicle, comprising:
a support structure movable between expanded and contracted states and forming a seating region that is greater in size when in the expanded state than in the contracted state;
a flexible covering movably coupled to the support structure, the support structure and the flexible covering cooperating to ensure that the flexible covering covers the seating region of the support structure when the support structure is in the expanded state, and in the contracted state;
a carrier assembly coupling a free end of the flexible covering to the support structure and allowing the free end of the flexible covering to move relative to the support structure as the support structure moves between the expanded state and the contracted state; and
a plurality of support ribs arranged longitudinally across the seating region.

10. The expandable seat according to claim 9, wherein the plurality of support ribs are more closely grouped when the support structure is in the contracted state.

11. The expandable seat according to claim 9, wherein at least one of the plurality of support ribs is moveably coupled to the support structure.

12. The expandable seat according to claim 9, wherein at least one of the plurality of support ribs is fixed to the support structure.

13. The expandable seat according to claim 9, wherein the flexible covering comprises at least one of the plurality of support ribs.

14. The expandable seat according to claim 9, wherein at least one of the plurality of support ribs is trapezoidal in cross section.

15. An expandable seat for a vehicle, comprising:
a support structure movable between expanded and contracted states and forming a seating region that is greater in size when in the expanded state than in the contracted state;
a flexible covering movably coupled to the support structure, the support structure and the flexible covering cooperating to ensure that the flexible covering covers the seating region of the support structure when the support structure is in the expanded state, and in the contracted state; and
a carrier assembly coupling a free end of the flexible covering to the support structure and allowing the free end of the flexible covering to move relative to the support structure as the support structure moves between the expanded state and the contracted state, wherein the carrier assembly is configured to movably couple a free end of the flexible covering to an underside of the support structure.

16. The expandable seat according to claim 15, wherein the expandable seat is configured to seat a plurality of occupants when the support structure is in the expanded state.

17. The expandable seat according to claim 15, wherein the support structure is configured to expand laterally.

18. The expandable seat according to claim 15, wherein the support structure comprises a body portion and at least one other portion that is movably coupled to the body portion to cause the support structure to expand.

19. The expandable seat according to claim 15, wherein the support structure is movable between a first state where the seating region is planar and a second state where the seating region is contoured.

* * * * *